Nov. 4, 1930.                F. H. PAGE                1,780,838
                  MEANS FOR CONTROLLING AEROPLANES
                    Filed Jan. 23, 1928      3 Sheets-Sheet 1
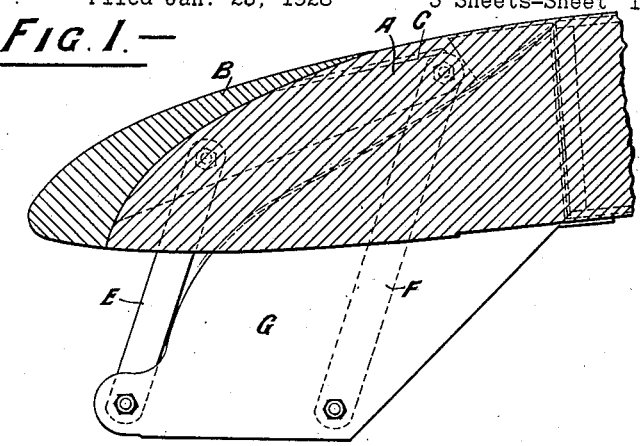
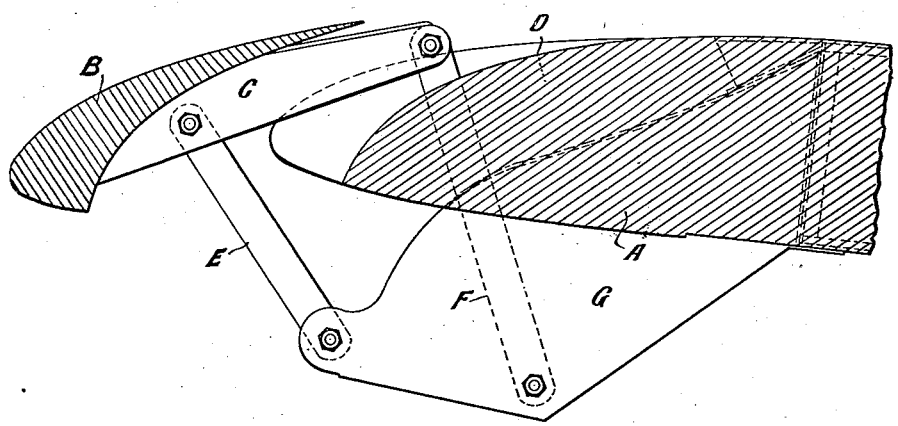
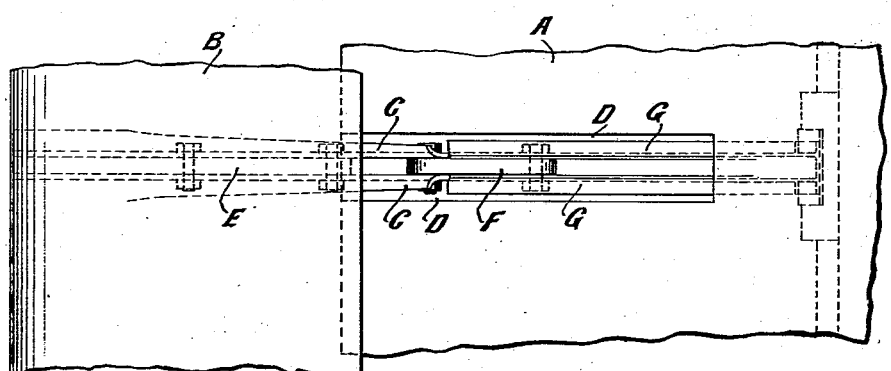

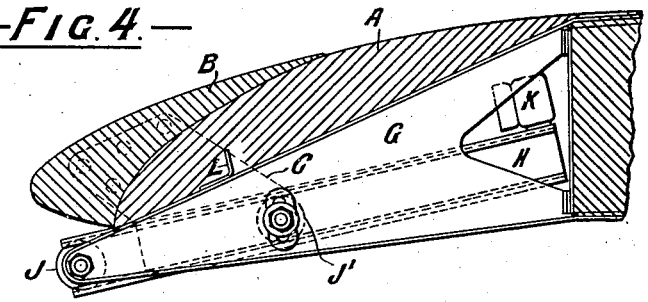
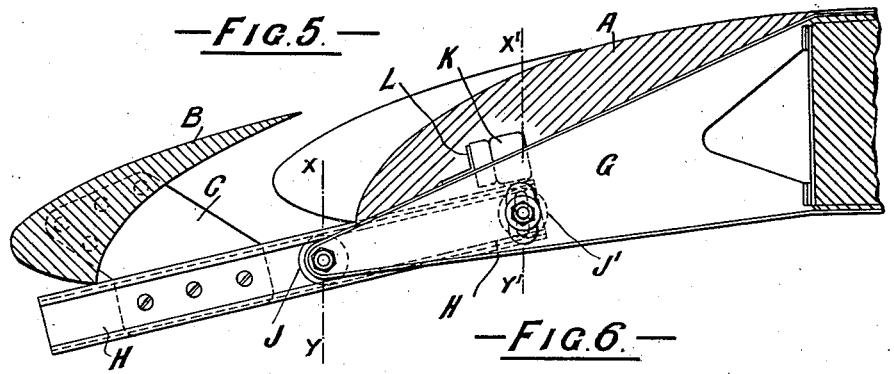
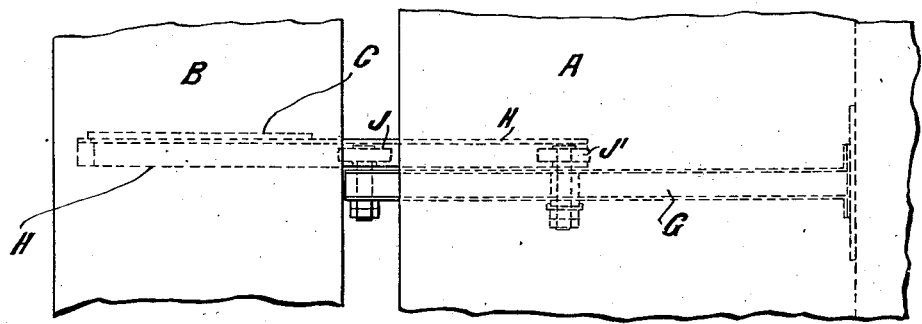
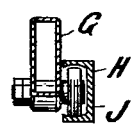
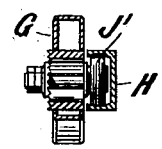

Nov. 4, 1930.  F. H. PAGE  1,780,838
MEANS FOR CONTROLLING AEROPLANES
Filed Jan. 23, 1928   3 Sheets-Sheet 3

Patented Nov. 4, 1930

1,780,838

UNITED STATES PATENT OFFICE

FREDERICK HANDLEY PAGE, OF LONDON, ENGLAND, ASSIGNOR TO HANDLEY PAGE LIMITED, OF LONDON, ENGLAND

MEANS FOR CONTROLLING AEROPLANES

Application filed January 23, 1928, Serial No. 248,919, and in Great Britain July 9, 1927.

In the specifications of several preceding patents which describe means now commonly known as the "Handley Page slotted wing," whereby aeroplane wings are maintained in efficient flight at larger angles of incidence than had previously been practicable, various means have been illustrated and described for operating forwardly located aerofoils in order to separate them from the forward portions of the main wings, so as to open slots between the forwardly located wings and the main wings when desired.

I have ascertained in the trial of the various aeroplane constructions fitted in accordance with these mechanisms, and also by means of specific wind channel tests, that with change in the angle of incidence of the main wings and forwardly located auxiliary wings, the pressure of the air flow on the upper surface of such forwardly located wings diminishes with the increase in the angle of incidence of the combined structure taken as a whole. The continued increase in the angle of incidence ultimately removes the positive pressure on the upper surface of the forwardly located wing, and induces a negative pressure or suction, consequently, should the forwardly located wing be free to move about suitable pivots or on suitable guides, the forwardly located wing will move away from the main wing automatically when the angle of incidence has increased sufficiently to induce the forwardly located wing to leave the main wing. In a similar way, the reduction in the angle of incidence of the structure as a whole, causes the forwardly located wing to return to its position against the main wing. These movements of the forwardly located wing can only be secured if the said forwardly located wing is free to move on guiding members in such a way as to permit the change in pressure to effect this adjustment, and also if no mechanism is interposed which will prevent the change in air pressure causing the forwardly located wing to adjust itself automatically.

The object of my invention therefore is to apply this discovery to the controlling of aeroplanes. In its broadest aspect the invention therefore consists in means for controlling aeroplanes comprising a main wing having a forwardly located section separable in a forward direction therefrom the said section being so formed and guided that in flight at small angles of incidence the pressures received on its faces maintain it in contact with the main wing while as the angle of flight of the aeroplane increases the guiding mechanism permits the forward section to leave the main wing under the influence of the change in the air pressures on its surface and to advance to a position which permits air to flow between the forward section and the main wing. Further features of the invention and various forms of construction applicable to produce the said result are described in the succeeding part of this specification and claimed in the claiming clauses thereof.

The forwardly located wing is preferably formed of a forward section of the wing itself, in such a manner that when in its rearmost position it forms part of the wing presenting an unbroken contour. This forward section may extend to any portion of the span of the wing, and each such section by reason of its system or arrangement of its path of movement may be caused to move in a forward direction at any predetermined change in the angle of incidence.

The movements of the forward section may be suitably guided by links or by runners in slides, suitable connecting means being provided when necessary to ensure the parallel movement of the said forward section. In the accompanying drawings three sonstructions are illustrated as examples of means for guiding and controlling the movements of the said forward sections as they move automatically under the influence of the change in pressure on their surfaces.

Figure 1 is a diagrammatic section which illustrates a wing in which the forward section is carried on the upper ends of two links, the lower ends of the links being pivoted to a bracket on the main wing. In the position illustrated, the forward section and the main wing are close together, forming a wing of unbroken contour.

Figure 2 is a similar view of the same wing with the forward section drawn into the forward position by the change in pressure of the air on its surface.

Figure 3 is a plan view of Figure 2.

Figure 4 is a diagrammatic section of a wing in which the forward section is carried on runners, the said forward section being in the closed position.

Figure 5 illustrates the same mechanism in the open position.

Figure 6 is a plan of Figure 5.

Figure 7 is a detail view taken on the line X, Y, of Figure 5, and

Figure 8 is a similar view taken on the line $X^1$, $Y^1$, of Figure 5.

Figure 9:
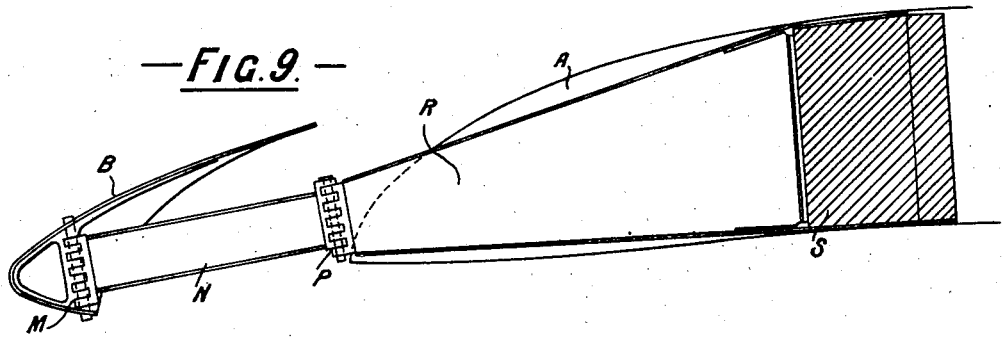
Figure 9 is a diagrammatic section of a wing in which the forward section is carried on hinged links, the said forward section being in the open position.

Referring to the drawings, A is the main wing, and B is the forward section of the said main wing. C is a rearwardly extending arm attached to the underside of the forward section B and which enters a recess D in the forward face of the main wing A.

In the arrangement illustrated in Figures 1, 2 and 3, the arm C is supported on the upper pivots of links E and F. The lower pivots of the links E and F are carried on a downwardly depending bracket G, which is convenient for carrying such links in the case of wings of insufficient thickness to carry the pivots inside. For the particular wing section illustrated the link E is shorter than the link F for the purpose of causing the front portion of the forward section B to move in a forward direction away from the wing at a greater rate than the rear portion, thus ensuring the maintenance of a true form of slot. The comparative lengths of these links E and F may be determined according to the position it is required for the forward section B to assume when it is moved forward under the influence of the change in air pressures.

It is desirable so to design the links which support the automatically operated forward section, as to cause the said forward section to move to a point where the resultant forces are in equilibrium.

When the forward section advances into the forward position, it opens a slot between itself and the main wing A, being guided in its travel by the radius of the links E and F which support the said forward section. The lengths of these links E and F and the positions of their supporting pivots on the bracket G, determine the path of travel of the forward section as it is moved forward under the action of the air pressures. By making, for example, the forward links E shorter than the after links F, and locating the pivots of the after links farther back in the structure of the main wing A, the forward section may be moved outwards with its leading edge progressing in a forward direction to a greater extent than the trailing edge; and thus a slot having greater width at its entrance than at its exit may be secured.

In the arrangement illustrated in Figures 4 to 8, the arm C instead of being pivoted, as in the first example illustrated, is attached to a sliding bar H which is conveniently of channel section suitable for enclosing two fixed rollers J, $J^1$, carried on the bracket G, suitably attached to the main wing. In this construction the forward section is free to travel forwards in a straight path following the line of the bar H when the air pressures on the said forward section B draw it away from the main wing so as to leave a slot between itself and the main wing. A buffer K on the inner end of the bar H limits the distance of travel of the bar H by coming into contact with a stop L fixed on the bracket G. This buffer and stop, therefore, determine the extent of movement of the forward section B, and consequently the amount of opening of the slot.

One of the rollers ($J^1$) is shown in the drawing with a vertical adjustment permitting its location to be raised or lowered for the purpose of adjusting the line of movement of the forward section B.

Figure 10:
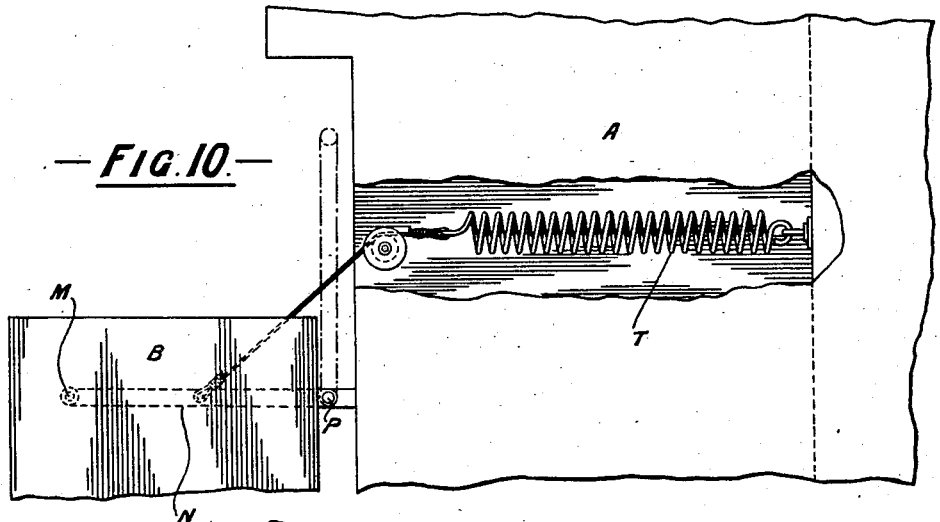
Figure 10 is a plan of Figure 9.
Figure 11:
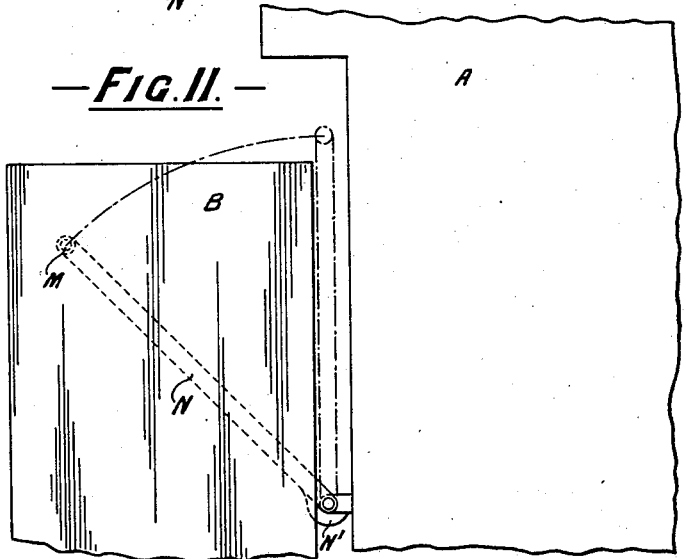
Figure 11 is a plan of a slightly modified construction to that illustrated at Figures 9 and 10.

In the arrangement illustrated in Figures 9, 10 and 11, instead of carrying the forward section B on a rearwardly extending arm C as in the examples before illustrated, the said forward section B is hinged at M to hinged links N, one only of such links being illustrated. The rearward hinge supporting the hinged link N is indicated at P where the said hinge P connects the hinged link N to the forward end of a bracket R which is shown attached to the forward spar S of the wing to which the forward section B is applied. A spring T which, as illustrated in Figure 10, tends to keep the slot closed, restrains the advance of the forward section B causing it to advance slowly against the spring tension when moved forward by change in air pressure and ensures the return of the said forward section B without being prevented from so returning by reason of the dead centres of the hinged links N. The hinged links N may be prevented from extending beyond a forward limit of, say, 60° by a stop such as the stop $N^1$ seen in Figure 11, and the hinged links N are so proportioned that in this modified construction the forward section completes its outward travel before arriving at the dead centre of the hinged links N. This permits the forward section B to return to the closed position when the resultant pressures on the said forward section B return to a direction behind the plane containing the axes of the said hinges P.

In all constructions where the forward section is carried on pivoted links or is turned on gate-like hinges, the angle of resultant pressure on the forward section at which the slot is to be opened may be determined by the angular setting of the links and the axes of the hinges. Also, in cases where the forward section is controlled on rails or guides, the angular setting of the rail determines which angle of the resultant pressure shall tend to move the forward section in a forward direction. Thus, any resultant pressure angle inclining in advance of the axes of the hinges will commence to draw the forward section forward, while, with a straight rail, any resultant pressure forward of an angle of 90° to such straight rail, will tend to move the forward section forward.

The automatic arrangement for controlling the movement may be applied to forward sections extending throughout the major portion of wings either in large sections or in small sections, and sections automatically operated as above described may also be located at the outer ends of the wings in front of the locations of the ailerons, where they will ensure the outer ends of the wings remaining efficient even after the central main portions of the wings have become stalled.

Damping devices, such as dashpots or elastic cushions, may be provided for the purpose of regulating and ensuring smooth change in position of the forward sections of the wing.

In the case of the application of the automatic air operated sections to the outer portions of the wings, mechanical connections with lost motion devices may be introduced between the forward section and the aileron, in order that, when the slot is opened by the air pressures as described above, an upward excessive or any upward movement of the aileron above the normal closes or partially closes the slot at the leading edge in front of it.

The forces acting on the forward aerofoil, causing it to open, may be utilized to pull down a flap at the rear of the wing, by connecting the forward section of the wing to a flap at the rear of the wing, so that as the forward section advances and opens the slot between itself and the main wing, the flap may be drawn down by the forward section as the latter moves forward automatically.

Instead of employing a forward section which is moved forwardly to open a slot under the influence of air pressures on its surface, the said movable section may be located at the back of the wing and open a slot by reason of its movement in a rearward direction under the influence of air pressures on its surfaces. Alternatively, such rearward section may be used conjointly with the forward automatically operated section. The pivots and slides would, in such rearwardly moving section, be reversed in direction compared with the pivots and slots on a forward section.

By the use of automatic air-operated sections which open the slots in the wings when the angle of incidence has increased beyond a predetermined degree, the range in flying angles of the wing may be increased to a very considerable degree. If the automatically operated sections extend throughout the span of the wings, an aircraft is secured in which the stalling angle may be increased, say, from 14° to, say, 25°. It is practicable with such an application of the invention, to fly the machine at the larger angles, but when the increased angular limit is reached, the machine would then be liable to stalling on attaining the increased angular limit of incidence in the same way in which machines not fitted with slot apparatus are liable to stall when exceeding their smaller critical angle.

In cases where the automatic sections are fitted only to the outer portions of the wings, the angle of stalling on such outer portions is delayed, whilst the central portion of the machine where the automatically-operating sections are not applied, remains subject to stalling at the earlier critical angle of incidence. Consequently, the machine fitted with automatic slot sections on the outer ends of the wings cannot become out of control by merely increasing its angle of incidence, because, when the centre portion of the machine becomes stalled, the outer ends of the wings are under full control. Lateral stability may therefore be secured by the application of slot mechanism applied to the outer ends of the wings, so as automatically to open under the influence of the air pressures before the stalling angle of the machine has been attained.

It is also obvious that by fitting the central portion of the machine with automatic slot-operated mechanism designed to increase the flying angle of the main portion of the wings to, say 20°, and by fitting the outer ends of the wings with slot mechanism designed to increase the available flying angle of such outer portions of the wing to, say, 25°, a machine may be produced which has an increased lift due to the wings lifting at angles not attained before the introduction of the slot mechanism, and which are safe from all possibility of stalling when attaining the critical angle of the central portion of the machine.

What I claim as my invention and desire to secure by Letters Patent is:—

1. In aeroplanes, the combination of a main wing and a forwardly located auxiliary wing, said auxiliary wing freely movable toward and away from said main wing within prescribed limits solely by the action of the air pressure on the surface of said auxiliary wing.

2. In aeroplanes, the combination of a main wing and a forwardly located auxiliary wing adapted to nest over the forward edge of the main wing said auxiliary wing freely moveable away from the main wing in a forward direction for a limited distance solely under the influence of the air pressure on the surface of said auxiliary wing and freely moveable back toward and into nesting relation with the main wing solely under the influence of the air pressure on the surface of the auxiliary wing.

3. In aeroplanes, the combination of a main wing and a forwardly located auxiliary wing adapted to nest over the forward edge of the main wing, said auxiliary wing freely moveable away from the main wing in a forward direction for a limited distance without substantially modifying its angular relation to the main wing solely under the influence of the air pressure on the surface of said auxiliary wing and freely moveable back toward and into nesting relation with the main wing solely under the influence of the air pressure on the surface of said auxiliary wing.

4. In aeroplanes, means for automatically establishing a slot adjacent the forward edge of the main wing at large angles of incidence and automatically closing said slot at normal angles of incidence comprising a main wing and a forwardly located auxiliary wing, said auxiliary wing freely moveable toward and away from said main wing within prescribed limits solely by the action of the air pressure on the surface of said auxiliary wing.

5. In aeroplanes, the combination of a main wing and a forwardly located auxiliary wing, said auxiliary wing freely movable toward and away from said main wing within prescribed limits solely by the action of the air pressure on the surface of said auxiliary wing, pivots fixed to the main wing and means associating said auxiliary wing and said pivots adapted to permit the said auxiliary wing to remain in contact with the main wing while at small angles of incidence when the pressure received on its faces maintains it in contact with the main wing, while as the angle of flight of the aeroplane increases the auxiliary wing will leave the main wing solely under the influence of the change of the air pressures on its surfaces.

6. In aeroplanes, the combination of a main wing and a forwardly located auxiliary wing, said auxiliary wing freely movable toward and away from said main wing within prescribed limits solely by the action of the air pressure on the surface of said auxiliary wing and links adapted to support and guide such forward wing in its forward and return movements.

7. In aeroplanes, the combination of a main wing and a forwardly located auxiliary wing, said auxiliary wing freely movable toward and away from said main wing within prescribed limits solely by the action of air pressure on the surface of said auxiliary wing and guides for the auxiliary wing which permit a sliding movement to and fro.

8. In aeroplanes, the combination of a main wing and a forwardly located auxiliary wing, said auxiliary wing freely movable toward and away from said main wing within prescribed limits solely by the action of the air pressure on the surface of said auxiliary wing and means adapted to support and guide said auxiliary wing in its forward and return movements and permit said auxiliary wing to move to any position within the prescribed limits where the resultant forces are in equilibrium under the influence of the air pressures acting upon it.

9. In aeroplanes, the combination of a main wing and a forwardly located auxiliary wing, said auxiliary wing freely movable toward and away from said main wing within prescribed limits solely by the action of the air pressure on the surface of said auxiliary wing, means associating the auxiliary wing and main wing adapted to regularly increase the angle which is formed between the chord of the auxiliary wing and the chord of the main wing as the auxiliary wing moves forwardly.

10. In aeroplanes, means for automatically establishing a slot adjacent the forward edge of the main wing at large angles of incidence and automatically closing said slot at normal angles of incidence, comprising a main wing and a forwardly located auxiliary wing, said auxiliary wing freely movable toward and away from said main wing within prescribed limits solely by the action of the air pressure on the surface of said auxiliary wing and including means associating the auxiliary wing and main wing adapted to assure that in all intermediate positions of the auxiliary wing as well as in the fully open position the slot thus formed has its opening on the under surface of the wing in advance of the opening of the upper surface.

11. In aeroplanes, means for automatically establishing a slot adjacent the forward edge of the main wing at large angles of incidence and automatically closing said slot at normal angles of incidence, comprising a main wing and a forwardly located auxiliary wing, said auxiliary wing freely movable toward and away from said main wing within prescribed limits solely by the action of the air pressure on the surface of said auxiliary wing and means associating the main wing and auxiliary wing adapted to assure that in all intermediate positions as well as in the fully open position the slot thus formed between the upper and lower surface has its opening on the under side of the wing of greater width in the fore and aft direction than the opening on the upper side.

12. In aeroplanes, means for automatically establishing a slot adjacent the forward edge of the main wing at large angles of incidence and automatically closing said slot at normal angles of incidence, comprising a main wing and a forwardly located auxiliary wing, said auxiliary wing freely movable toward and away from said main wing within prescribed limits solely under the action of the air pressure on the surface of said auxiliary wing and means associating the main wing and auxiliary wing adapted to assure that in all intermediate positions as well as in the fully open position of the auxiliary wing, the walls of the slot thus formed are curved rearwardly from the lower opening to the upper opening so as to direct the air passing through the slot with the minimum possible disturbance from the lower surface where there is pressure to the upper surface, where there is suction.

In witness whereof I have hereunto set my hand.

FREDERICK HANDLEY PAGE.